(12) United States Patent
Funato et al.

(10) Patent No.: US 11,661,944 B2
(45) Date of Patent: May 30, 2023

(54) ELECTRIC COMPRESSOR

(71) Applicant: KABUSHIKI KAISHA TOYOTA JIDOSHOKKI, Kariya (JP)

(72) Inventors: Motonobu Funato, Aichi-ken (JP); Mikio Yoshida, Aichi-ken (JP); Kenji Hayakawa, Aichi-ken (JP); Yusuke Kinoshita, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 207 days.

(21) Appl. No.: 17/124,681

(22) Filed: Dec. 17, 2020

(65) Prior Publication Data

US 2021/0199117 A1    Jul. 1, 2021

(30) Foreign Application Priority Data

Dec. 26, 2019  (JP) .............................. JP2019-236674

(51) Int. Cl.

| F04D 25/06 | (2006.01) |
| H02K 5/08 | (2006.01) |
| H02K 11/33 | (2016.01) |
| F25B 31/02 | (2006.01) |
| F04D 29/40 | (2006.01) |

(52) U.S. Cl.
CPC ............. *F04D 25/06* (2013.01); *F04D 29/40* (2013.01); *F25B 31/026* (2013.01); *H02K 5/08* (2013.01); *H02K 11/33* (2016.01); *H02K 2211/03* (2013.01)

(58) Field of Classification Search
CPC ........ F04B 35/04; F04B 39/06; F04B 39/121; F04C 29/047; F04C 2240/805; F04C 2240/808
See application file for complete search history.

(56) References Cited

U.S. PATENT DOCUMENTS

| 8,257,060 B2 * | 9/2012 | Hattori .................. H01L 23/492 |
| | | 417/321 |
| 9,599,109 B2 * | 3/2017 | Yakushiji .............. F04C 29/047 |

(Continued)

FOREIGN PATENT DOCUMENTS

| CN | 108270324 A | 7/2018 |
| JP | 2013-021918 A | 1/2013 |
| WO | 2019082255 A1 | 5/2019 |

OTHER PUBLICATIONS

Communication dated Aug. 10, 2021, from the Intellectual Property of India in application No. 202044054925.

*Primary Examiner* — Dominick L Plakkoottam
(74) *Attorney, Agent, or Firm* — Sughrue Mion, PLLC

(57) ABSTRACT

An electric compressor includes a compression portion, an electric motor, a drive circuit that has a circuit board on which electronic components are mounted, a housing, and a resin member. At least one of the electronic components is held by the resin member with the resin member sandwiched between the at least one of the electronic component and the circuit board. The electronic compressor includes a first metal member that is in contact with the at least one of the electronic components, and thermally connected to the housing, a second metal member that is disposed in the resin member, and a bolt by which the first metal member and the second metal member are fastened with each other.

3 Claims, 2 Drawing Sheets

(56) References Cited

U.S. PATENT DOCUMENTS

2010/0183457 A1\* 7/2010 Hattori .................. H01L 25/162
  417/410.1
2016/0013701 A1\* 1/2016 Suitou ..................... H02K 5/24
  310/43

\* cited by examiner

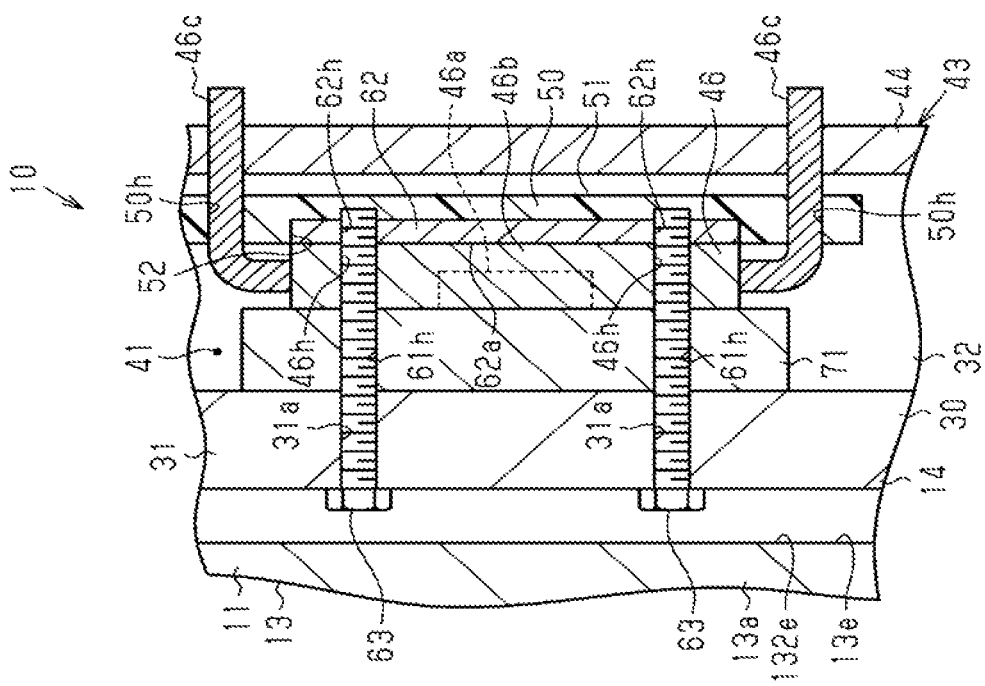
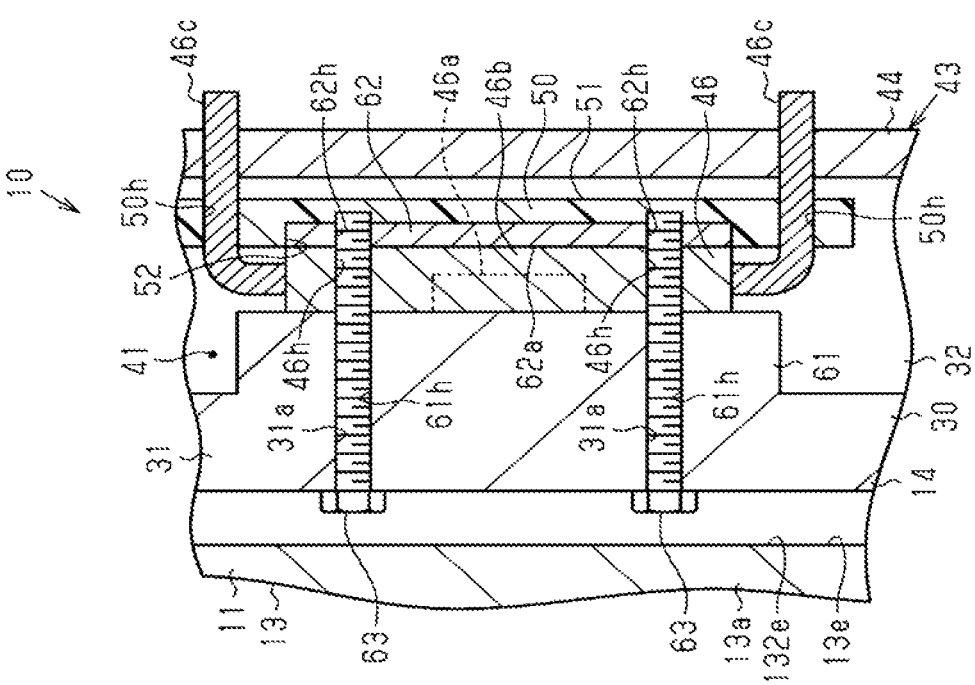

ELECTRIC COMPRESSOR

CROSS-REFERENCE TO RELATED APPLICATION

This application claims priority to Japanese Patent Application No. 2019-236674 filed on Dec. 26, 2019, the entire disclosure of which is incorporated herein by reference.

BACKGROUND ART

The present disclosure relates to an electric compressor.

An electric compressor generally includes a compression portion configured to compress fluid, an electric motor configured to drive the compression portion, a drive circuit that has a circuit board on which electronic components are mounted to drive the electric motor, and a housing in which the compression portion, the electric motor, and the drive circuit are accommodated. For example, Japanese Patent Application Publication No. 2013-21918 discloses an electric compressor further including a resin member that has a placement surface on which the circuit board is placed and holds the electronic components.

Heat generated from the electronic components is dissipated into, for example, the housing. However, when the electronic components themselves are deformed by the heat, the heat generated from the electronic components is sometimes difficult to transfer to the housing. Then, the heat generated from the electronic components may not be effectively dissipated into the housing.

The present disclosure has been made in view of the above circumstances and is directed to providing an electric compressor in which heat generated from electronic components may be effectively dissipated into a housing.

SUMMARY

In accordance with an aspect of the present disclosure, there is provided an electric compressor including a compression portion configured to compress fluid, an electric motor configured to drive the compression portion, a drive circuit that has a circuit board on which electronic components are mounted so as to drive the electric motor, a housing that accommodates the compression portion, the electric motor, and the drive circuit, and a resin member that has a placement surface on which the circuit board is placed, and holds the electronic components. At least one of the electronic components is held by the resin member with the resin member sandwiched between the at least one of the electronic components and the circuit board. The electronic compressor includes a first metal member that is formed in a plate-like shape, in contact with the at least one of the electronic components, and thermally connected to the housing, a second metal member that is formed in a plate-like shape and disposed in the resin member with the at least one of the electronic components sandwiched between the second metal member and the first metal member, and a bolt by which the first metal member and the second metal member are fastened with each other.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which:

FIG. 2 is a cross-sectional view showing a part of the electric compressor of FIG. 1; and FIG. 3 is a cross-sectional view showing a part of an electric compressor according to another embodiment of the present disclosure.

DETAILED DESCRIPTION OF THE EMBODIMENTS

Figure 1:
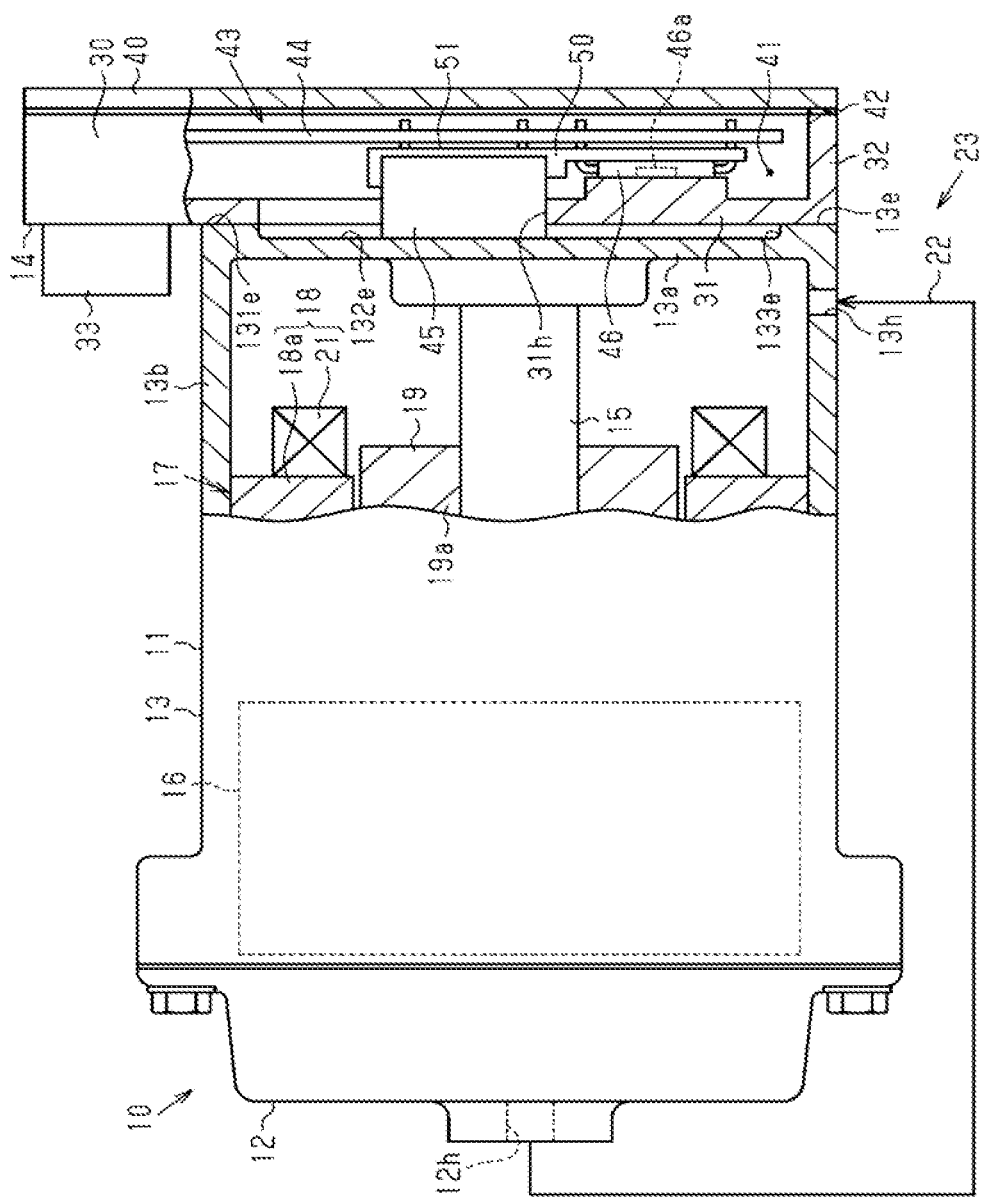
FIG. 1 is a side cross-sectional view, partially broken away, of an electric compressor according to an embodiment of the present disclosure.

The following will describe an electric compressor according to an embodiment of the present invention with reference to FIGS. 1 and 2. The electric compressor of the present embodiment is, for example, used for a vehicle air conditioner.

As illustrated in FIG. 1, an electric compressor 10 includes a housing 11 that is made of metal and has a bottomed cylindrical shape. The housing 11 has an outlet housing 12 that is formed in a bottomed cylindrical shape, a motor housing 13 that is formed in a bottomed cylindrical shape and connected to the outlet housing 12, and an inverter case 14 that is connected to the motor housing 13. The outlet housing 12, the motor housing 13, and the inverter case 14 are made of, for example, aluminum.

The motor housing 13 has a bottom wall 13a that is formed in a plate-like shape and a peripheral wall 13b that is formed in a cylindrical shape and extends from an outer peripheral portion of the bottom wall 13a. An outer surface 13e of the bottom wall 13a of the motor housing 13 has an outermost surface 131e, a recessed surface 132e, and a step surface 133e. The outermost surface 131e is located in an outer peripheral portion of the outer surface 13e, and formed in an annular shape extending over the entire periphery of the outer surface 13e. The recessed surface 132e is disposed in a recessed position from the outermost surface 131e. The outermost surface 131e and the recessed surface 132e are connected to each other by the step surface 133e that is formed in an annular shape and extends in an axial direction of the motor housing 13. An inlet port 13h is formed through the peripheral wall 13b of the motor housing 13. Refrigerant as fluid is taken into the motor housing 13 through the inlet port 13h.

A rotary shaft 15 is accommodated in the motor housing 13. A rotational axis of the rotary shaft 15 is the same as a central axis of the peripheral wall 13b of the motor housing 13. A compression portion 16 and an electric motor 17 are also accommodated in the motor housing 13. The electric motor 17 is configured to drive the compression portion 16 by rotating the rotary shaft 15. The compression portion 16 is configured to compress the refrigerant by the rotation of the rotary shaft 15. Accordingly, the housing 11 accommodates the compression portion 16 and the electric motor 17. The compression portion 16 and the electric motor 17 are arranged in an axial direction in which the rotational axis of the rotary shaft 15 extends. The electric motor 17 is disposed closer to the bottom wall 13a of the motor housing 13 than the compression portion 16.

The compression portion 16 is a scroll type compression portion, which includes, for example, a fixed scroll (not shown) fixed in the motor housing 13 and a movable scroll (not shown) disposed so as to face the fixed scroll.

The electric motor 17 includes a stator 18 that is formed in a cylindrical shape and a rotor 19 that is disposed inside the stator 18. The rotor 19 rotates integrally with the rotary shaft 15. The stator 18 surrounds the rotor 19. The rotor 19 has a rotor core 19a fixed to the rotary shaft 15 and a plurality of permanent magnets (not shown) disposed in the rotor core 19a. The stator 18 has a stator core 18a that is formed in a cylindrical shape and a motor coil 21 which is wound around each of teeth of the stator core 18a.

The inlet port 13h is connected to one end of an external refrigerant circuit 22. An outlet port 12h is formed through the outlet housing 12. The outlet port 12h is connected to the other end of the external refrigerant circuit 22. The refrigerant taken into the motor housing 13 from the external refrigerant circuit 22 through the inlet port 13h is compressed in the compression portion 16 by the driving of the compression portion 16, and discharged to the external refrigerant circuit 22 through the outlet port 12h. The refrigerant discharged to the external refrigerant circuit 22 flows through a heat exchanger (not shown) and an expansion valve (not shown) of the external refrigerant circuit 22, and returns to the motor housing 13 through the inlet port 13h. The electric compressor 10 and the external refrigerant circuit 22 cooperate to form a vehicle air conditioner 23.

The inverter case 14 has a case main body 30 that is formed in a bottomed cylindrical shape and a cover 40 that closes an opening of the case main body 30. The case main body 30 has a case bottom wall 31 that is formed in a plate-like shape and a case peripheral wall 32 that is formed in a cylindrical shape, and extends from an outer peripheral portion of the case bottom wall 31. The case main body 30 is connected to the motor housing 13 by attaching the case bottom wall 31 to the bottom wall 13a of the motor housing 13. An area of the case bottom wall 31 is larger than that of the bottom wall 13a of the motor housing 13. This means that a portion of the case bottom wall 31 is spread over an edge of the bottom wall 13a of the motor housing 13 outward in a radial direction of the motor housing 13. A connector connecting portion 33 that is formed in a cylindrical shape is protruded from the spread portion of the case bottom wall 31 over the edge of the bottom wall 13a of the motor housing 13.

The cover 40 is formed in a plate-like shape and covers an opening of the case peripheral wall 32. The cover 40 and the case main body 30 cooperate to form an inverter accommodation chamber 41. A gasket 42 that is formed in an annular shape is interposed between an end face of the case peripheral wall 32 opposite the case bottom wall 31 and the cover 40. The inverter case 14 is sealed from the outside with the gasket 42 interposed between the end face of the case peripheral wall 32 opposite the case bottom wall 31 and the cover 40.

The electric compressor 10 includes a drive circuit 43. The drive circuit 43 has a circuit board 44. A capacitor 45 and a power module 46 as electronic components are mounted on the circuit board 44 so as to drive the electric motor 17. The capacitor 45 forms an LC filter. A plurality of switching elements 46a is modularized in the power module 46. The drive circuit 43 is accommodated in the inverter accommodation chamber 41. The case peripheral wall 32 surrounds the drive circuit 43.

Accordingly, the housing 11 accommodates the compression portion 16, the electric motor 17, and the drive circuit 43. The compression portion 16, the electric motor 17, and the drive circuit 43 are accommodated in the housing 11 in such a manner that the compression portion 16, the electric motor 17, and the drive circuit 43 are arranged in the axial direction of the rotary shaft 15 in this order. The bottom wall 13a of the motor housing 13 divides the drive circuit 43 from the electric motor 17.

A through hole 31h is formed through the case bottom wall 31 of the case main body 30. The capacitor 45 is inserted through the through hole 31h. The capacitor 45 is inserted through the through hole 31h, and is in contact with the recessed surface 132e of the motor housing 13.

The electric compressor 10 includes a resin member 50. The resin member 50 is a holder member that holds the electronic components such as the capacitor 45 and the power module 46, which are mounted on the circuit board 44. The resin member 50 has a placement surface 51 on which the circuit board 44 is placed.

As illustrated in FIG. 2, the power module 46 has a plate-like mold portion 46b that is made of resin with which the switching elements 46a are molded, and a plurality of lead wires 46c that are electrically connected to the switching elements 46a and protrude from the mold portion 46b. The power module 46 is held by the resin member 50 with the resin member 50 sandwiched between the power module 46 and the circuit board 44. The resin member 50 is disposed between the circuit board 44 and the power module 46. The resin member 50 has lead holes 50h through which the lead wires 46c are inserted. The lead wires 46c are inserted through the lead holes 50h, and electrically connected to the circuit board 44. Accuracy of the positioning of the lead wires 46c relative to the circuit board 44 is improved by inserting the lead wires 46c through the lead holes 50h.

The electric compressor 10 includes a first metal member 61, a second metal member 62, and bolts 63. The first metal member 61 is formed in a plate-like shape. The first metal member 61 is integrally formed with the case bottom wall 31 of the case main body 30. That is, the first metal member 61 of the present embodiment forms a part of the case bottom wall 31. The first metal member 61 forms a part of an inner surface of the case bottom wall 31. The power module 46 is disposed so as to face the first metal member 61 in a state where a thickness direction of the first metal member 61 is the same as that of the mold portion 46b. The first metal member 61 is in surface-contact with the mold portion 46b of the power module 46. In addition, the first metal member 61 is disposed indirectly in contact with the bottom wall 13a of the motor housing 13 with the case bottom wall 31 interposed between the first metal member 61 and the bottom wall 13a of the motor housing 13, and thermally connected to the bottom wall 13a of the motor housing 13 with the case bottom wall 31 interposed therebetween.

A second metal member 62 is formed in a plate-like shape. The second metal member 62 is disposed in the resin member 50. The second metal member 62 is, for example, integrally formed with the resin member 50 by insert molding. The power module 46 is disposed so as to face the second metal member 62 in a state where a thickness direction of the second metal member 62 is the same as that of the mold portion 46b. Accordingly, the first metal member 61 and the second metal member 62 are disposed in such a manner that the thickness direction of the first metal member 61 is the same as that of the second metal member 62.

The second metal member 62 has a surface 62a on which the second metal member 62 is in surface-contact with the mold portion 46b of the power module 46. The power module 46 is sandwiched between the second metal member 62 and the first metal member 61. That is, the surface 62a of the second metal member 62 cooperates with the first metal member 61 to hold the power module 46 therebetween. The resin member 50 includes a recess portion 52 in which portions of the second metal member 62 except for the surface 62a which cooperates with the first metal member 61 to hold the power module 46 between the first metal member 61 and the second metal member 62 are embedded. Accordingly, surfaces of the second metal member 62 except for the surface 62a which cooperates with the first metal member 61 to hold the power module 46 between the first metal member 61 and the second metal member 62 are disposed in the recess portion 52 and in surface-contact with an inner surface of the recess portion 52.

The first metal member 61 and the second metal member 62 are fastened with each other by the bolts 63. Insertion holes 61h are formed through the first metal member 61. The bolts 63 are inserted through the insertion holes 61h. In addition, communication holes 31a that are communicated with the insertion holes 61h are formed through the case bottom wall 31 of the case main body 30. One end of each communication hole 31a is communicated with the corresponding one of the insertion holes 61h, and the other end of the communication hole 31a opens at an outer surface of the case bottom wall 31 and faces the recessed surface 132e of the bottom wall 13a of the motor housing 13.

Mold insertion holes 46h are formed through the mold portion 46b of the power module 46. The bolts 63 are inserted through the mold insertion holes 46h. The mold insertion holes 46h pass through the mold portion 46b in the thickness direction of the mold portion 46b. The mold insertion holes 46h are communicated with the insertion holes 61h of the first metal member 61.

The second metal member 62 has internal threaded holes 62h into which the bolts 63 are screwed. The internal threaded holes 62h are formed through the second metal member 62, and extends in a thickness direction thereof. A part of the resin member 50 closes openings of the internal threaded holes 62h which are located on the circuit board 44 side. The bolts 63 are inserted through the communication holes 31a, the insertion holes 61h, and the mold insertion holes 46h, and screwed into the internal threaded holes 62h. With this configuration, the first metal member 61 and the second metal member 62 are fastened with each other by the bolts 63, and the power module 46 is held by the resin member 50 with the power module 46 sandwiched between the first metal member 61 and the second metal member 62. The bottom wall 13a of the motor housing 13, the first metal member 61, the power module 46, the second metal member 62, the resin member 50, the circuit board 44, and the cover 40 are arranged in the axial direction of the rotary shaft 15 in this order.

The power module 46 is electrically connected to a ground via the bolts 63, the case bottom wall 31, and the motor housing 13. The lead wires 46c of the power module 46 are inserted through the lead holes 50h of the resin member 50 and electrically connected to the circuit board 44. DC voltage is converted to AC voltage by switching operation of the switching elements 46a, and the AC voltage as drive voltage is applied to the electric motor 17 via the lead wires 46c and the circuit board 44. This drives the electric motor 17. The compression portion 16 is driven by the rotation of the rotary shaft 15 along with the driving of the electric motor 17, so that the refrigerant is compressed by the compression portion 16.

The following will describe an operation of the present embodiment.

In the present embodiment, the power module 46 is sandwiched between the first metal member 61 and the second metal member 62, and the first metal member 61 and the second metal member 62 are fastened with each other by the bolts 63. With this configuration, even if the power module 46 itself is to be deformed by heat, the deformation of the power module 46 is restrained by the first metal member 61 and the second metal member 62. The first metal member 61 is in contact with the power module 46, and is thermally connected to the motor housing 13. In the motor housing 13, the inlet port 13h is cooled by the refrigerant which is taken into the motor housing 13 through the inlet port 13h, so that heat generated from the power module 46 is dissipated into the motor housing 13 via the first metal member 61. Accordingly, the heat generated from the power module 46 is effectively dissipated into the motor housing 13.

The above-described embodiment has the following advantageous effects.

(1) The electric compressor 10 includes the first metal member 61 that is formed in a plate-like shape, in contact with the power module 46, and thermally connected to the motor housing 13, the second metal member 62 that is formed in a plate-like shape and disposed in the resin member 50 with the power module 46 sandwiched between the second metal member 62 and the first metal member 61, and the bolts 63 by which the first metal member 61 and the second metal member 62 are fastened with each other. With this configuration, the power module 46 is sandwiched between the first metal member 61 and the second metal member 62, and the first metal member 61 and the second metal member 62 are fastened with each other by the bolts 63, so that even if the power module 46 itself is to be deformed by heat, the deformation of the power module 46 is restrained by the first metal member 61 and the second metal member 62. The first metal member 61 is in contact with the power module 46 and thermally connected to the motor housing 13, so that the heat generated from the power module 46 is dissipated into the motor housing 13 via the first metal member 61. Accordingly, the heat generated from the power module 46 may be effectively dissipated into the motor housing 13.

(2) The first metal member 61 has the insertion holes 61h through which the bolts 63 are inserted. The second metal member 62 has the internal threaded holes 62h into which the bolts 63 are screwed through the second metal member 62. The bolts 63 are inserted through the insertion holes 61h and screwed into the internal threaded holes 62h. The resin member 50 closes the openings of the internal threaded holes 62h that are located on the circuit board 44 side. With this configuration, the resin member 50 closes the openings of the internal threaded holes 62h that are located on the circuit board 44 side, so that attachment of metal chips produced by forming the internal threaded holes 62h in the second metal member 62 to the circuit board 44 may be avoided.

(3) The resin member 50 includes the recess portion 52 in which the portions of the second metal member 62 except for the surface 62a which cooperates with the first metal member 61 to hold the power module 46 between the first metal member 61 and the second metal member 62 are embedded. With this configuration, the portions of the second metal member 62 except for the surface 62a which cooperates with the first metal member 61 to hold the power module 46 between the first metal member 61 and the second metal member 62 are embedded in the recess portion 52 of the resin member 50, so that the metal chips produced by forming the internal threaded holes 62h in the second metal member 62 are difficult to be discharged from a space between the second metal member 62 and the resin member 50. Thus, the attachment of the metal chips produced by forming the internal threaded holes 62h in the second metal member 62 to the circuit board 44 may be more easily avoided.

(4) The bottom wall 13a of the motor housing 13, the first metal member 61, the power module 46, the second metal member 62, the resin member 50, the circuit board 44, and the cover 40 are arranged in this order, so that the first metal member 61 may be disposed in a position which is closest to the bottom wall 13a that divides the drive circuit 43 from the electric motor 17. Accordingly, the heat generated from the power module 46 may be effectively dissipated into the bottom wall 13a of the motor housing 13 from the first metal member 61.

(5) For example, it may be considered that the bolts 63 are inserted through the resin member 50, the second metal member 62, and the mold portion 46b in this order, and screwed into the first metal member 61, so that the first metal member 61 and the second metal member 62 are fastened with each other by the bolts 63. In this case, a distance between a head portion of each bolt 63 and the circuit board 44 needs to be large enough so as to ensure an insulating distance between the head portion of the bolt 63 and the circuit board 44. This causes a fear that a size of the electric compressor 10 is increased by the extended length of the distance between the head portion of the bolt 63 and the circuit board 44. In the present embodiment, since the bolts 63 pass through the communication holes 31a, the insertion holes 61h, and the mold insertion holes 46h, and are screwed into the internal threaded holes 62h, so that the first metal member 61 and the second metal member 62 are fastened with each other by the bolts 63, the above-described problem does not occur. Therefore, the size of the electric compressor 10 is not increased.

(6) The power module 46 is electrically connected to the ground via the bolts 63, the case bottom wall 31, and the motor housing 13. With this configuration, noise from the switching elements 46a flows into the ground through the bolts 63, the case bottom wall 31, and the motor housing 13, so that the noise from the switching elements 46a may be restrained from being radiated.

(7) The second metal member 62 is in surface-contact with the mold portion 46b of the power module 46. With this configuration, the heat generated from the power module 46 is dissipated into the second metal member 62 as well as the first metal member 61, so that the heat generated from the power module 46 may be effectively dissipated.

(8) The first metal member 61 and the second metal member 62 are fastened with each other by the bolts 63 with the power module 46 sandwiched between the first metal member 61 and the second metal member 62. With this configuration, vibration resistance of the power module 46 is improved, so that a connection between the lead wires 46c and the circuit board 44 may be kept in good condition.

The above-described embodiment according to the present disclosure may be modified as follows. The above-described embodiment and the following modifications may be combined with each other appropriately, as long as there is no technical contradiction.

As illustrated in FIG. 3, a first metal member 71 may be a separate member from the case bottom wall 31 of the case main body 30. The first metal member 71 is formed in a plate-like shape. The first metal member 71 is placed on a part of the inner surface of the case bottom wall 31. A thickness direction of the first metal member 71 is the same as that of the case bottom wall 31. The power module 46 is disposed so as to face the first metal member 71 in a state where the thickness direction of the first metal member 71 is the same as that of the mold portion 46b. The first metal member 71 is in surface-contact with the mold portion 46b of the power module 46. In addition, the first metal member 71 is thermally connected to the bottom wall 13a of the motor housing 13 with the case bottom wall 31 interposed between the first metal member 71 and the bottom wall 13a of the motor housing 13.

In the embodiment, the mold insertion holes 46h through which the bolts 63 are inserted do not need to be formed through the mold portion 46b of the power module 46. This means that the electric compressor 10 may have a configuration in which the first metal member 61 and the second metal member 62 are fastened with each other by the bolts 63 that are disposed in positions in which the bolts 63 do not interfere with the power module 46.

In the embodiment, for example, the bolts 63 pass through the resin member 50, the second metal member 62, and the mold portion 46b in this order, and are screwed into the first metal member 61, so that the first metal member 61 and the second metal member 62 may be fastened with each other by the bolts 63.

In the embodiment, the power module 46 is described as one example of the electronic components sandwiched between the first metal member 61 and the second metal member 62. However, the electronic components are not limited to the power module 46. A kind of the sandwiched electronic components is not particularly limited, as long as the electronic components are mounted on the circuit board 44.

In the embodiment, the electric compressor 10 may have a configuration in which, for example, a bottomed cylindrical cover member is attached to the bottom wall 13a of the motor housing 13, and the inverter accommodation chamber 41 that accommodates the drive circuit 43 is formed by the outer surface of the bottom wall 13a of the motor housing 13 and an inner surface of the cover member. In this case, the cover member forms a part of the housing 11. The first metal member 61 that is formed in a plate-like shape may be attached to the outer surface of the bottom wall 13a of the motor housing 13, for example, with potting resin interposed between the first metal member 61a and the outer surface of the bottom wall 13a.

In the embodiment, the second metal member 62 may be disposed in the recess portion 52 in a state where a part of one surface of the second metal member 62 except for the surface 62a which cooperates with the first metal member 61 to hold the power module 46 between the first metal member 61 and the second metal member 62 is spread over the recess portion 52.

In the embodiment, the resin member 50 does not need to include the recess portion 52. The second metal member 62 may be disposed in the resin member 50 with the whole of the second metal member 62 exposed from the resin member 50.

In the embodiment, the electric compressor 10 may have a configuration in which, for example, the drive circuit 43 is disposed outward of the motor housing 13 in a radial direction of the rotary shaft 15. This means that the compression portion 16, the electric motor 17, and the drive circuit 43 do not need to be arranged in the axial direction of the rotary shaft 15 in this order.

In the embodiment, the compression portion 16 is not limited to a scroll type compression portion. For example, the compression portion 16 may be of a piston type and a vane type.

In the embodiment, the electric compressor 10 forms the vehicle air conditioner 23. However, the electric compressor 10 is not limited to this configuration, and may be mounted on a fuel cell vehicle and compress air as fluid supplied to fuel cells by the compression portion 16.

What is claimed is:

1. An electric compressor, comprising:
a compression portion configured to compress fluid;
an electric motor configured to drive the compression portion;
a drive circuit that has a circuit board on which electronic components are mounted so as to drive the electric motor;
a housing that accommodates the compression portion, the electric motor, and the drive circuit; and
a resin member that has a placement surface on which the circuit board is placed, and holds the electronic components, wherein
at least one of the electronic components is held by the resin member with the resin member sandwiched between the at least one of the electronic components and the circuit board,
the electric compressor includes:
   a first metal member that is formed in a plate-like shape, in contact with the at least one of the electronic components, and thermally connected to the housing, and having an insertion hole;
   a second metal member that is formed in a plate-like shape and disposed in the resin member with the at least one of the electronic components sandwiched between the second metal member and the first metal member, and having an internal threaded hole; and
   a bolt by which the first metal member and the second metal member are fastened with each other, the bolt being inserted through the insertion hole and screwed into the internal threaded hole through the second metal member,
wherein the resin member closes an opening of the internal threaded hole that is located on a circuit board side.

2. The electric compressor according to claim 1, wherein the resin member includes a recess portion in which portions of the second metal member except for a surface which cooperates with the first metal member to hold the at least one of the electronic components between the first metal member and the second metal member are embedded.

3. The electric compressor according to claim 1, wherein the compression portion, the electric motor, and the drive circuit are accommodated in the housing in such a manner that the compression portion, the electric motor, and the drive circuit are arranged in this order,
the housing includes:
   a bottom wall that divides the drive circuit from the electric motor;
   a peripheral wall that surrounds the drive circuit; and
   a cover that covers an opening of the peripheral wall, and
the bottom wall, the first metal member, the at least one of the electronic components, the second metal member, the resin member, the circuit board, and the cover are arranged in this order.

* * * * *